United States Patent [19]

Kato et al.

[11] Patent Number: 4,994,968

[45] Date of Patent: Feb. 19, 1991

[54] WORD PROCESSING DEVICE

[75] Inventors: Kumiko Kato; Chiharu Hori, both of Nagoya, Japan

[73] Assignee: Brother Kogyo Kabushiki Kaisha, Japan

[21] Appl. No.: 499,803

[22] Filed: Mar. 27, 1990

[30] Foreign Application Priority Data

Mar. 30, 1989 [JP] Japan .................... 1-78960

[51] Int. Cl.⁵ ........................................... G06F 15/40
[52] U.S. Cl. ..................... 364/419; 400/76
[58] Field of Search ................ 364/419; 400/61-63, 400/70, 76

[56] References Cited

U.S. PATENT DOCUMENTS

| | | | |
|---|---|---|---|
| 4,686,649 | 8/1987 | Rush et al. | 400/63 |
| 4,804,278 | 2/1989 | Goton et al. | 400/62 |
| 4,831,583 | 5/1989 | Pascoe | 400/76 |
| 4,848,940 | 7/1989 | Mori | 400/76 |
| 4,865,474 | 9/1989 | Matsuyama | 400/61 |

*Primary Examiner*—Michael R. Fleming
*Assistant Examiner*—Gail O. Hayes
*Attorney, Agent, or Firm*—Kane, Dalsimer, Sullivan, Kurucz, Levy, Eisele and Richard

[57] ABSTRACT

A word processing device capable of registering character phrases with abbreviated phrase names, respectively, said device comprises a keyboard for inputting the registered phrase name and for formatting the inputted phrase name, and the inputted phrase name is used to retrieve the registered phrase corresponding thereto in such a fashion that the phrase is formatted in the same formatting conditions as those of the inputted and formatted phrase name.

19 Claims, 6 Drawing Sheets

FIG. 6
| A , a | X1 |
|---|---|
| B , b | X2 |
| C , c | X3 |
| ⋮ | ⋮ |
| Z , z | X26 |
FIG. 7
FIG. 8(a)
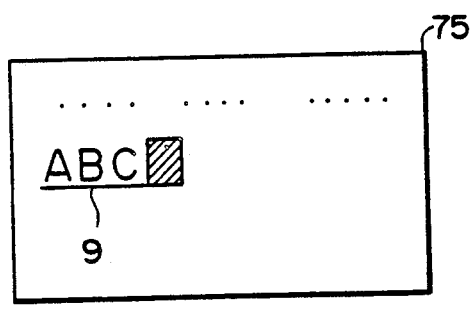
FIG. 8(c)
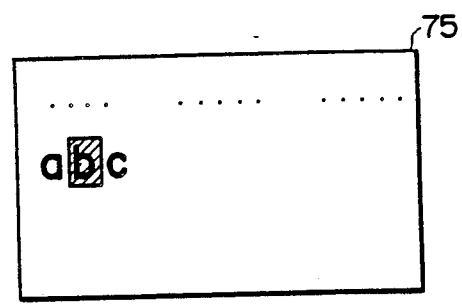
FIG. 8(b)
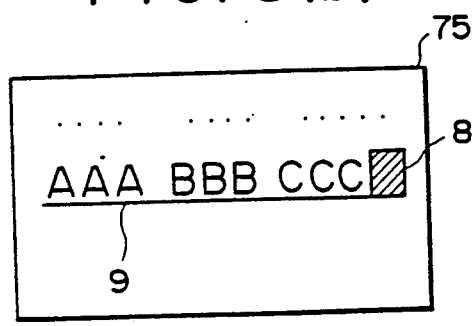
FIG. 8(d)
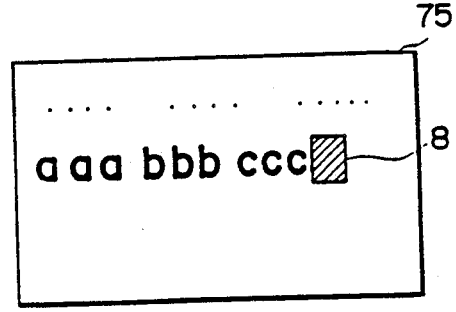

WORD PROCESSING DEVICE

BACKGROUND OF THE INVENTION

The present invention relates to a word processing device capable of registering original phrases with desired phrase names, respectively, and converting an inputted phrase name into corresponding original phrase having been registered with the same phrase name as inputted one.

Conventionally, there has been known a word processing device capable of registering phrases with desired phrase names, respectively, and also capable of converting the phase name into corresponding phrase through predetermined conversion steps. This kind of device is designed to simplify the keyboard operation by storing pairs of long phrase and corresponding short phrase name as phrase data, detecting the same phrase name inputted to identify the corresponding original phrase, and then replacing the phrase name with the original phrase.

In the case above, however, type of letters (capital letters or small letters) and formatting codes, which informing the style of the characters such as bold or underlined letters, of the phrase data are simultaneously saved with the phrase data. As a result, for example, the same sequence of capital letters and small letters should be separately registered; phrase having different formatting codes such as underlined or bold letters should also be separately registered.

On the other hand, when the phrase data does not include the formatting codes, it should be formatted when the phrase name is converted into the original phrase. If there are large number of such characters without the formatting codes, complicated process has to be repeated when the phrase name is converted into the original phrase. The same process is applied to a case where the formatting codes of the phrase is changed into others.

SUMMARY OF THE INVENTION

It is therefore an object of the invention to provide a word processing device capable of registering original phrases with desired phrase names, respectively, and determining the formatting codes to be supplied to the characters of the original phrase when the phrase name is converted into the original phrase.

In order to solve the aforementioned problems, according to the invention, there is provided a word processing device capable of registering character phrases with abbreviated phrase names, respectively, the device comprises phrase name input means for inputting the registered phrase name, formatting means for formatting the phrase name inputted through the phrase name input means, and conversion means for converting the phrase name inputted through the phrase name input means and formatted by the formatting means, to the registered phrase corresponding thereto, in such a fashion that the phrase is formatted in accordance with the formatting conditions set by the formatting means when converted.

DESCRIPTION OF THE ACCOMPANYING DRAWINGS

FIG. 6 is a diagram illustrating the relation between alphabets and common codes;

FIG. 7 is a diagram illustrating a specific example of conversion data; and

FIGS. 8(a), 8(b), 8(c) and 8(d) are diagrams illustrating a specific example of converting operation.

DESCRIPTION OF THE EMBODIMENTS

Figure 1:
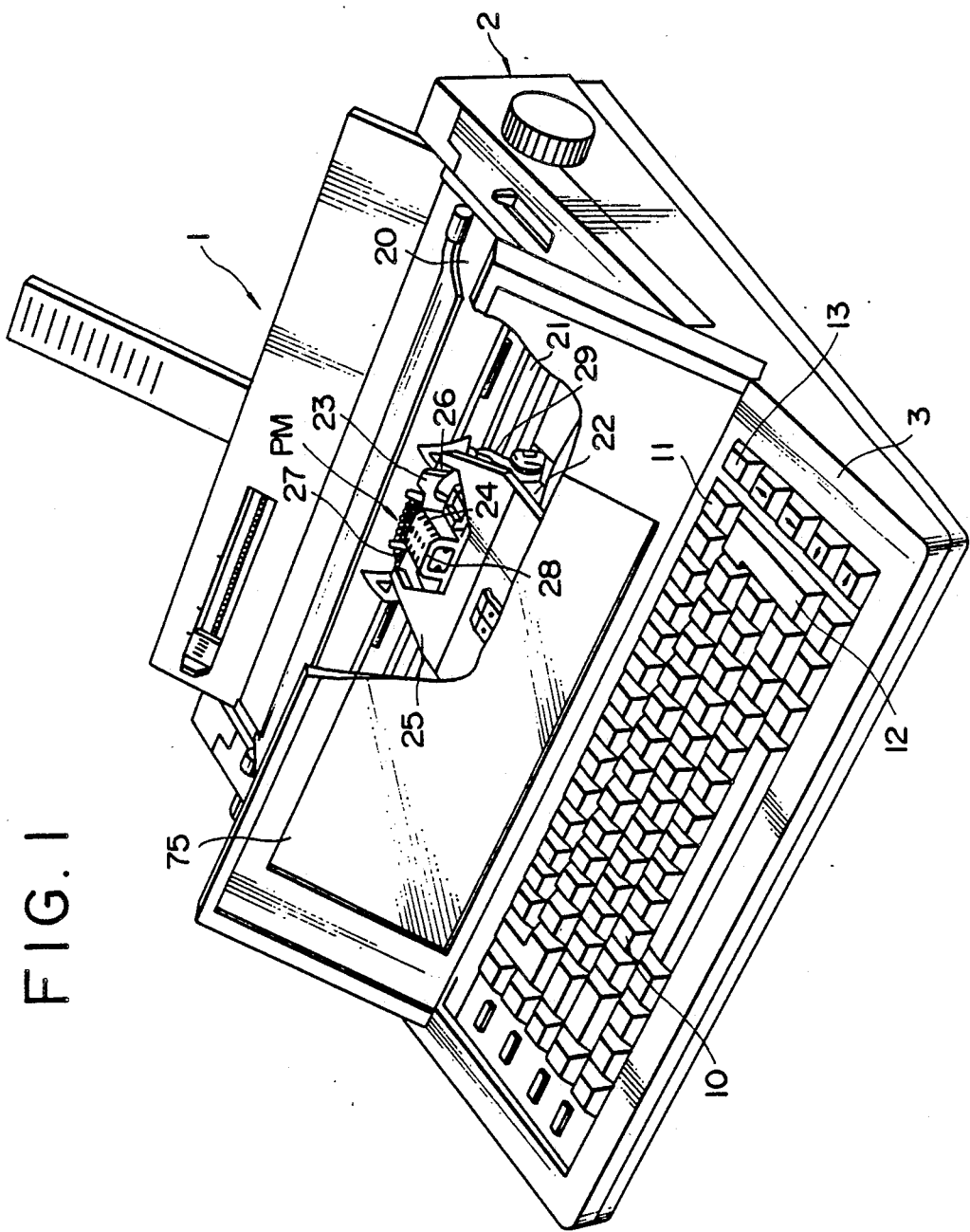
FIG. 1 is an external view of an electronic typewriter embodying the present invention.

FIG. 1 shows an electronic typewriter embodying the present invention.

As shown in FIG. 1, a keyboard 3 is disposed in the front portion of a body frame 2 of an electronic typewriter 1. A liquid crystal display 75 for displaying characters and symbols entered through the keyboard 3 is provided in the rear of the keyboard 3. A printing mechanism PM is disposed in the body frame 2 behind the keyboard 3 and the liquid crystal display 75. The character keys 10 are arranged to include alphabetical keys and symbol keys, a data conversion key 11, a return key 12, an END key 13 and other function keys on the keyboard 3 as in an ordinary typewriter.

The printing mechanism PM comprises a platen 20 for feeding printing paper, a motor (not shown) with a drive circuit for driving the platen 20, a carriage 22 supported by a guide member 21 in parallel to the platen 20, a motor (not shown) with a drive circuit for transversely reciprocally driving the carriage 22, a daisy wheel 24 accommodated in a wheel cassette 23, a motor (not shown) with a drive circuit for driving the daisy wheel 24, a printing ribbon 26 accommodated in a ribbon cassette 25, a motor (not shown) with a drive circuit for rolling the printing ribbon 26, a printing hammer for striking types of the daisy wheel 24, a solenoid with a drive circuit for driving the printing hammer, a ribbon switching mechanism for selectively arranging the printing ribbon 26 or a correction ribbon 29 at the printing position, etc. The printing mechanism PM is similar to that of any other ordinary electronic typewriter.

Figure 2:
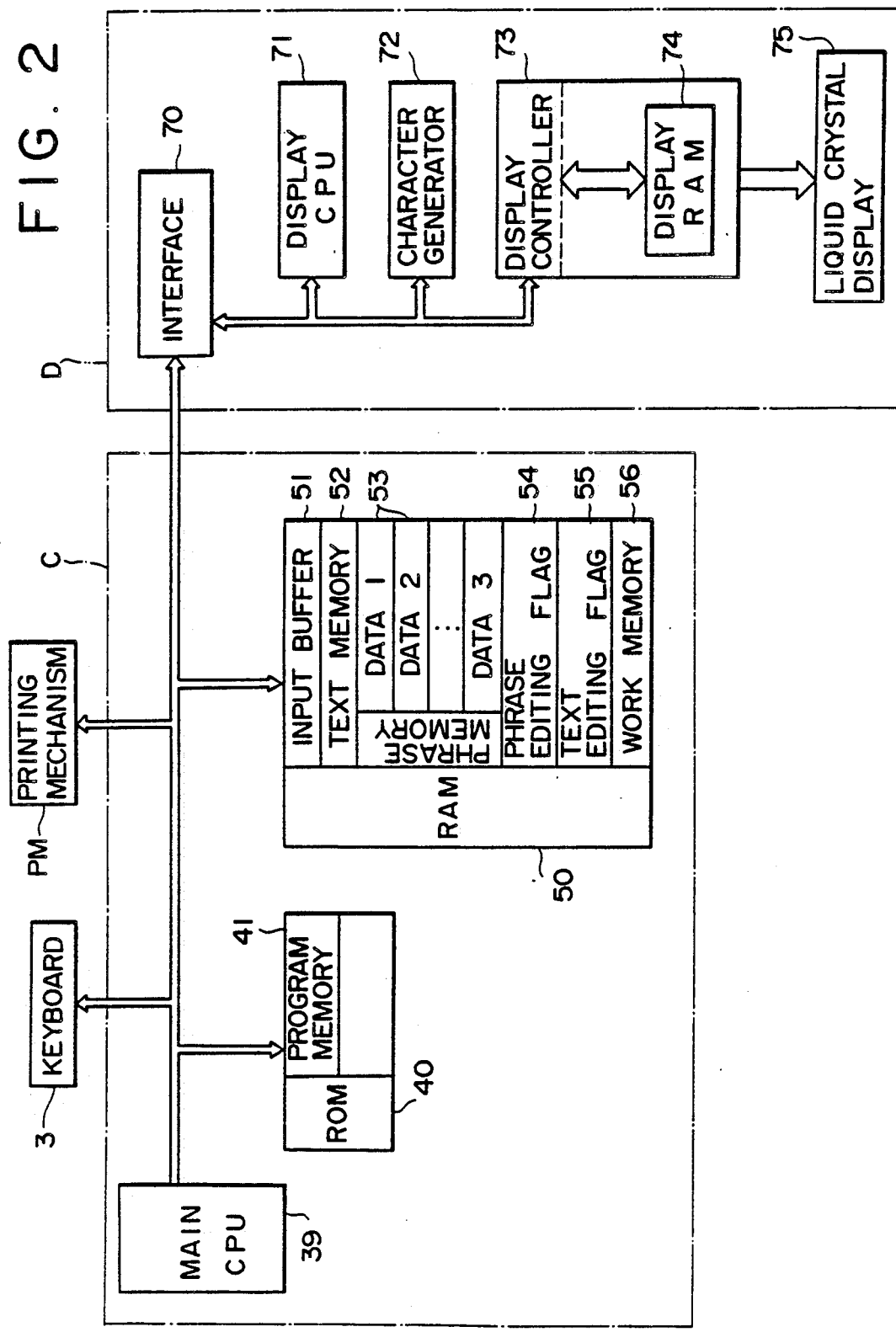
FIG. 2 is a block diagram of a control system.

FIG. 2 shows a block diagram of the control system of the electronic typewriter embodying this invention.

A control unit C comprises a main CPU (Central Processing Unit) 39 and the keyboard 3, the printing mechanism PM, a display mechanism D, a ROM 40 and a RAM 50 are electrically connected with the main CPU 39 of the control unit C through a data bus.

A program memory 41 of the ROM 40 stores programs for controlling the printing mechanism PM and the display mechanism D in conformity with code data entered through the character keys 10 and the function keys of the keyboard 3.

The RAM 50 comprises an input buffer 51 for storing data of the characters entered through the keyboard 3 or those read out of a text memory 52 in order to display the data of the characters on the display 75 in a display mode, the text memory 52 for storing input data as file data and a phrase memory 53 for storing predetermined character strings (proper nouns, addresses and sentences for frequent use, etc.) correspondingly to a phrase name as a phrase data. A pair of an original phrase and a phrase name are stored as one phrase data in the phrase memory 53, and several phrase data can be stored in the phrase memory 53. Further, the RAM 50 is provided with various kinds of memories and registers storing a phrase editing flag 54 for indicating whether a phrase data being prepared or not, a text editing flag 55 for indicating whether a text being prepared, and a work memory 56 for temporarily storing data.

The display mechanism D comprises an interface 70, a display CPU 71, a character generator 72, a display controller 73 and the liquid crystal display 75, these being electrically connected with each other as shown in FIG. 2.

Approximately 400 kinds of dot matrix display data corresponding to code data are stored in the character generator 72 so that characters and symbols are displayed on the display 75.

Based on the command data and the character data supplied from the main CPU 39 through the interface 70, the display CPU 71 reads the corresponding display data from the character generator 72 and supplies the display data to the display controller 73. The display controller 73 writes the display data onto the display RAM 74 and simultaneously supplies a display signal corresponding to the display data to the display 75. Moreover, the display CPU 71 controls the movement of a cursor 8 in order to give the display controller 73 an information of an address to which the cursor 8 to be moved through the interface 70 in conformity with a cursor movement signal received from the main CPU 39.

The main CPU 39 makes the printing mechanism PM print each character/symbol entered through the keyboard 3 in a typewriter mode. The main CPU 39 also displays inputted data on the display 75 in a word processor mode and also makes the text memory 52 and the phrase memory 53 store the display data correspondingly to the position displayed.

Figure 4:
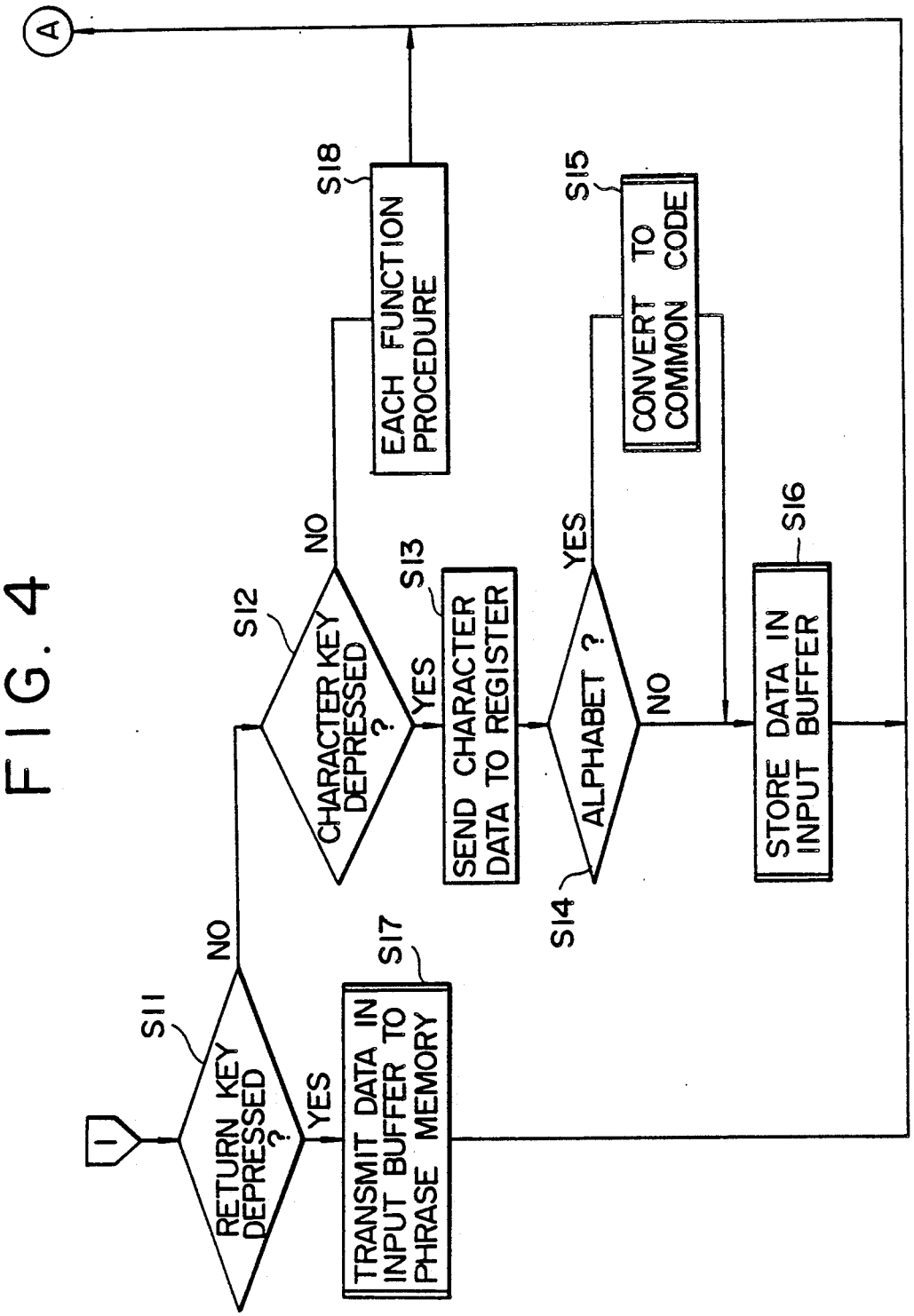
Figure 5:
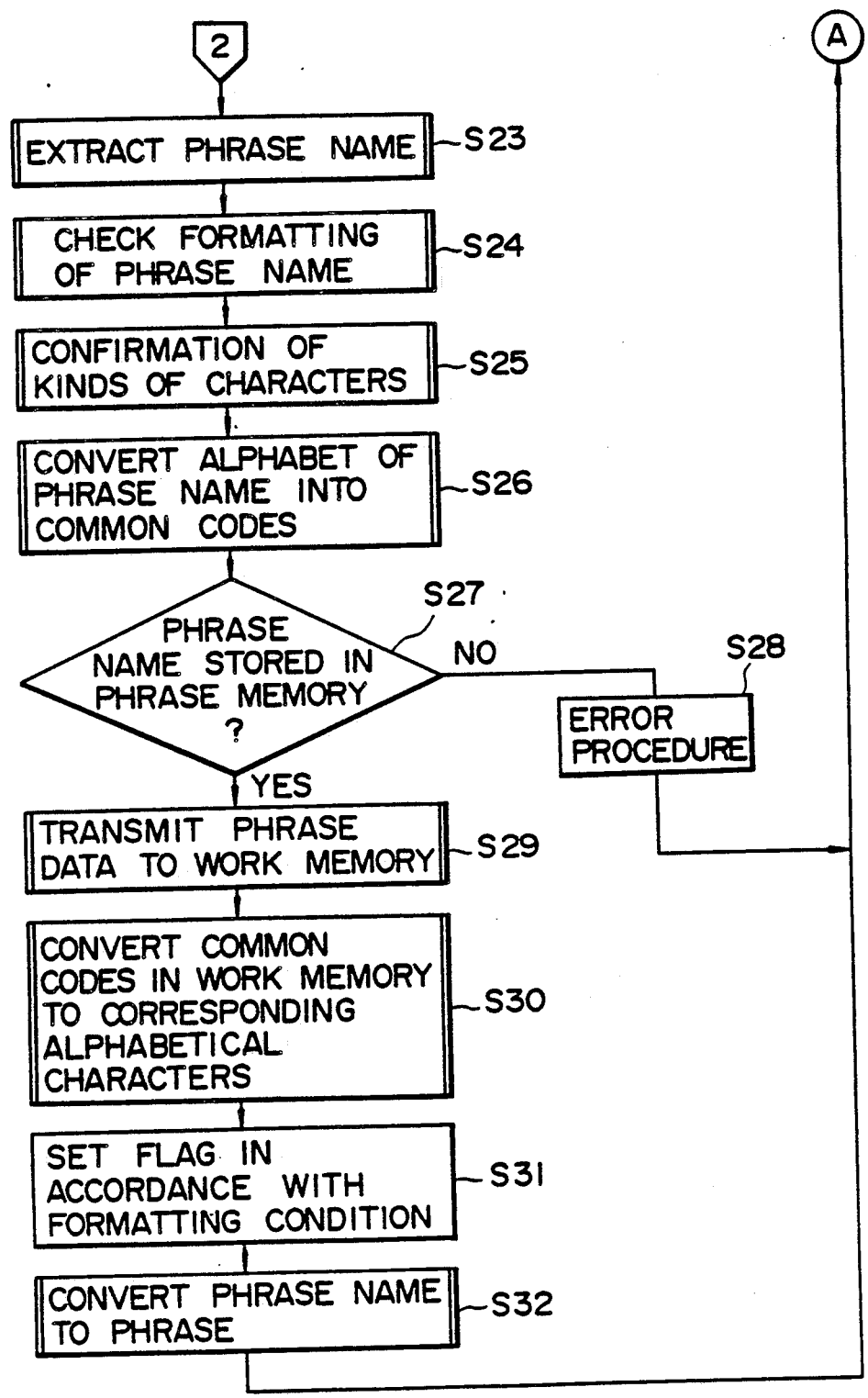

Control over the registration/conversion of the phrase data will subsequently be described with reference to flowcharts of FIGS. 3 through 5.

When power is supplied to the electronic typewriter 1, initialization is made in step S1 and an index screen is displayed on the display 75 in step S2. In other words, the word processor mode is set up. Then keyboarding is awaited in step S3. When data is keyboarded, it is examined whether each of the word processing flags (hereinafter referred to as the editing flags) has been set or not in step S4. If determined ON, each editing mode is followed. If determined OFF, it is further examined whether the editing mode conversion key has been depressed or not in step S5 and, if determined YES, the editing flag involved is set in step S6. If determined NO in step S5, a procedure corresponding to what has been keyboarded is performed.

Data registration in the phrase memory 53 is first described.

When the phrase editing mode is selected by means of the keyboard in step S3, the phrase editing flag 54 is set in step S6 through steps S4, S5. When the next key is depressed (YES, in step S3), step S9 through steps S4, S8 is followed and it is examined whether the phrase editing flag 54 has been set or not. Since the phrase editing flag 54 has been set at this time, it is further examined whether the END key 13 for indicating the termination of the operation of the phrase memory has been depressed or not in step S10. If determined NO, it is examined whether the data determination key (return key 12) has been depressed or not in step S1 of FIG. 4. If NO, it is examined whether the character key 10 has been depressed or not in step S12. If determined YES, character data is taken into the register in step S13 and the data is further examined whether it is the data of alphabetic letters or not in step S14. If YES in step S14, the data is converted into a common code in step S15.

As shown in FIG. 6, an capital letter and a small letter are converted into common codes in such a manner that 'A' and 'a' are converted into X1, 'B' and 'b' into X2, . . . 'Z' and 'z' into X26 (X1–X26 represent common codes). The common codes are stored in the input buffer 51 in step S16. If the input character is that other than alphabetic letters, on the other hand, step S15 is skipped and step S16 is followed where the character code is stored in the input buffer 51 as it is. This process is performed on a character basis. When the data determination key 12 is depressed during the phrase data editing operation, the data in the input buffer 51 are successively stored in the phrase memory 53 in step S17.

When the data determination key 12 is depressed first time, the data is registered in the phrase name division of the phrase memory 53 as the phrase name is entered. When the original phrase is subsequently entered, character codes or common codes of alphabetic letters are successively stored in the input buffer 51 likewise in steps S3, S4, and S8 through S16. When the data determination key 12 is depressed second time, the data in the input buffer 51 is stored in the phrase division following the phrase name division of the phrase memory 53 in step S17. As a result, the phrase name and the phrase in pair are registered in two divisions of one area of the phrase memory 53.

When any key other than the character key 10 is depressed, it is determined NO in step S12 and a function process corresponding to the keyboard operation is performed in step S18.

When another phrase name and another phrase are subsequently registered, the aforementioned process is repeated. When the registering operation is finished, and the END key 13 is depressed, it is determined YES in step S10 of FIG. 3 and the phrase editing flag 54 is cleared in step S19. The phrase memory editing screen of the display 75 is turned to the index screen in step S2.

Figure 3:
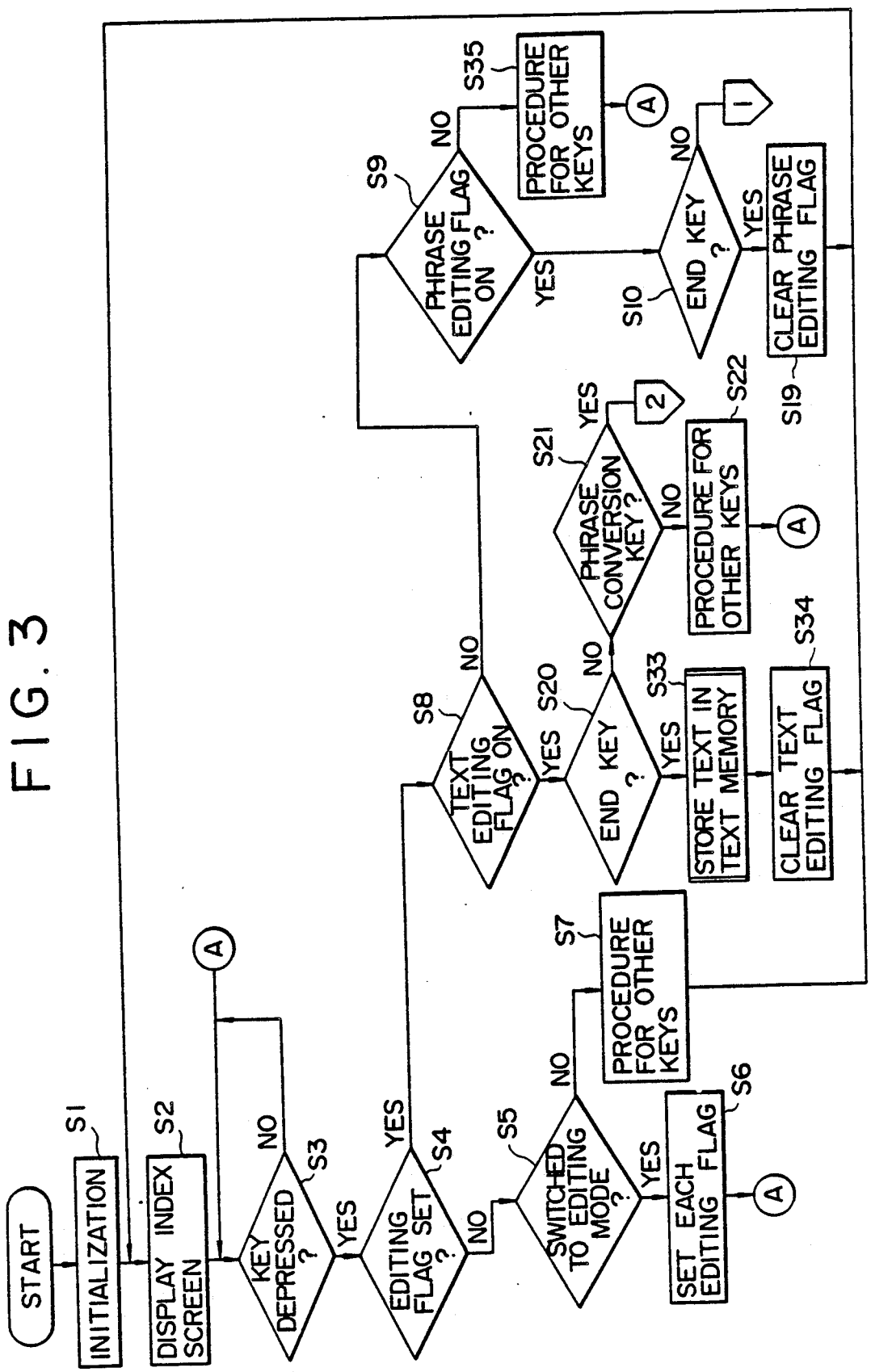
FIGS. 3 through 5 are control flowcharts.

When a key is depressed, in FIG. 3, the text editing flag 55 remains ON as texts are being processed and it is determined to be YES in step S8.

If the key thus depressed is the character key 10, the input data is stored in the input buffer 51 in step S22 through steps S20, S21. If the key thus depressed is not the END key 13 (NO, in step S20) but the phrase conversion key 11, it is determined to be YES in step S21 and the phrase name is extracted in step S23 of FIG. 5. In steps S24, S25, formatting codes and the letter type at the cursor position when the data conversion key 11 is depressed are temporarily stored, respectively. When the phrase name extracted in step S23 consists of alphabetic letters, the letters are converted into common codes in step S26 and the phrase memory 53 is detected whether the phrase name extracted in step S23 has been registered or not in step S27. When it has not been registered therein, a buzzer sounds in step S28 to notify to that effect. When it has been registered, the phrase corresponding to the phrase name thus detected and identified in step S27 is set in the data editing work memory 56 in step S29 and the phrase data portion in the work memory 56 is converted into alphabetic letters in conformity with the type of letters stored in S25.

The character formatting flag is set to the phrase data in step S31 so as to supply the formatting codes stored in step S24 to the characters. The phrase name designated on the display 75 is converted into phrase data in step S32.

More specifically, characters 'AAA⎵BBB⎵CCC' shown in FIG. 7, for instance, constitute the phrase division and these characters are assumed to be registered in a phrase name of 'ABC', ⎵ representing a space in this case.

In the text editing mode, the 'ABC' is entered during the processing of texts and subject to conversion. When it is desired to supply the formatting codes of an underline thereto, first, the underline 9 is supplied to the characters ABC thus entered as shown in FIG. 8(a) and then the data conversion key 11 is depressed. Then the data conversion is made in the conventional manner by retrieving a stored phrase corresponding to the phrase name in step S32 as shown in FIG. 8(b) and the same formatting codes (of underline 9) is added to the characters of the phrase.

When the type of letters and the formatting codes thereof are set to small and bold letters, 'abc' as shown in FIG. 8(c), and the data conversion key 11 is depressed, the phrase in the form of common codes is converted and displayed in small and bold letters as shown in FIG. 8(d).

Needless to say, type of letters and formatting codes may simultaneously be designated.

When the text processing is finished, the END key 13 is depressed (YES, in step S20). Then the text is stored in text memory 52 with an inputted file name in step S33. The text editing flag 55 is subsequently cleared in step S34 and step S2 is followed.

Moreover, editing modes other than the text and phrase editing modes are executed in step S35.

In addition to the converting operation shown in the embodiment shown, it is possible to convert a character string 'ABCDEF' registered in the phrase name of 'AB' into another string 'Abcdef' when the small letter is set after the capital letter like 'Ab' in the converting operation during the preparation of texts.

The word processing device according to the present invention is designed to register phrase in phrase name form of common codes excluding the formatting codes accompanied therewith when the phrase data is stored, irrespective of the type of letters. Thus designed, phrase is provided with the same formatting codes as what has been supplied to the phrase name at the time of phrase name conversion, so the alteration or addition of the formatting codes can readily be made. In addition, since letter type is determined correspondingly to those of inputted phrase name at the time of phrase name conversion, the phrases of the same word need not be registered by types of letters.

As set forth above, the word processing device according to the present invention allows the formatting of phrase data and letter type to be freely determined in conformity with the inputted phrase name when the phrase data is converted into the corresponding phrase, so that the registration and conversion of the phrase may be carried out simply and conveniently.

Although a description has been given of the formatting codes of underlines and bold types in the aforementioned embodiment, the present invention is also applicable to the formatting codes of superscripts, subscripts, expansion and the like.

What is claimed is:

1. A word processing device capable of registering character phrases with abbreviated phrase names, said device comprising:
    phrase name data input means for inputting said registered phrase name;
    formatting means for inputting formatting codes for formatting said phrase name inputted through said phrase name input means; and
    replacing means for replacing said phrase name inputted through said phrase name input means with registered phrase text data corresponding thereto and for formatting said registered phrase in accordance with any formatting codes inputted through said formatting means in such a fashion that said phrase, when converted, is formatted in accordance with the formatting codes set by said formatting means.

2. The word processing device according to claim 1, wherein said name input means comprises a keyboard having thereon a plurality of key means for inputting alphanumeric characters.

3. The word processing device according to claim 2, wherein said formatting means comprises key means on said keyboard for inputting formatting codes.

4. The word processing device according to claim 2, which further comprises memory means for storing pairs of said phrase name and said corresponding phrase, and wherein said conversion means comprises:
    detect means for detecting the phrase corresponding to said phrase name inputted through said phrase name input means in said memory means; and
    replace means for replacing said phrase name inputted through said phrase name input means with said corresponding phrase detected by said detect means in formatted condition in accordance with said formatting codes inputted through said formatting means.

5. The word processing device according to claim 4, wherein said memory means stores said character data excluding said formatting codes thereof.

6. The word processing device according to claim 4 wherein, said replacing means comprises another memory means for storing therein the formatting codes set by said formatting means.

7. The word processing device according to claim 1, which further comprises display means for displaying said text data in formatted condition in accordance with the formatting codes set by said formatting means.

8. A word processing device comprising:
    register means for registering character phrases with abbreviated phrase names, respectively;
    phrase name text input means for inputting one of said registered phrase names in capital or small letters;
    discriminating means for discriminating whether said registered phrase name text inputted through said phrase name input means is with capital letter or with small letter; and
    replacing means for replacing said phrase name text inputted through said phrase name input means with the letter type discriminated by said discriminating means.

9. The word processing device according to claim 8, wherein said register means comprises:
    data input means for inputting character phrases with abbreviated phrase names, in capital or small letters; and
    another replacing means for replacing capital letter data or small letter data into common data before registering said letter data.

10. The word processing device according to claim 9, wherein said register means further comprises memory means for storing pairs of said phrase name and said corresponding phrase, letters of said pairs of phrase name and phrase having been converted into said common data, and wherein said replacing means comprises:
  detect means for detecting the phrase corresponding to said phrase name inputted through said phrase name input means in said memory means; and
  replace means for replacing said phrase name inputted through said phrase name input means with said corresponding phrase detected by said detect means in capital letters or small letters in accordance with the letter type discriminated by said discriminating means.

11. The word processing device according to claim 8, wherein said name input means comprises a keyboard having thereon a plurality of key means for inputting alphanumeric characters.

12. The word processing device according to claim 8, which further comprises display means for displaying said text.

13. A word processing device comprising:
  phrase register means for registering character phrases with abbreviated names;
  phrase name text input means for inputting one of said registered phrase names in capital or small letters;
  formatting means for inputting formatting codes for formatting said phrase name text inputted through said phrase name input means;
  discriminating means for discriminating whether said registered phrase name text inputted through said phrase name input means is with capital or with small letters; and
  replacing means for replacing said phrase name text inputted through said phrase name input means with a registered phrase text data corresponding thereto with the letter type discriminated by said discriminating means, and for formatting said registered phrase in accordance with the formatting codes inputted by said formatting means.

14. The word processing device according to claim 13, wherein said name input means comprises a keyboard having thereon a plurality of key means for inputting alphanumeric characters.

15. The word processing device according to claim 13, wherein said formatting means comprises key means on said keyboard.

16. The word processing device according to claim 13, wherein said register means comprises memory means for storing pairs of said phrase name and said corresponding phrase, and wherein said conversion means comprises:
  detect means for detecting the phrase corresponding to said phrase name inputted through said phrase name input means in said memory means; and
  replace means for replacing said phrase name inputted through said phrase name input means with said corresponding phrase detected by said detect means in capital letters or small letters in accordance with the letter type discriminated by said discriminating means.

17. The word processing device according to claim 16, wherein said register means comprises:
  data input means for inputting character phrases with abbreviated phrase names, in capital or small letters; and
  another replacing means for replacing capital letter data or small letter data into common data before registering.

18. The word processing device according to claim 17, wherein said memory means stores said phrase name and said corresponding phrase excluding said formatting codes thereof.

19. The word processing device according to claim 13, which further comprises display means for displaying said text formatted condition.

* * * * *